(12) United States Patent
Wolfe

(10) Patent No.: US 8,321,614 B2
(45) Date of Patent: *Nov. 27, 2012

(54) DYNAMIC SCHEDULING INTERRUPT CONTROLLER FOR MULTIPROCESSORS

(75) Inventor: Andrew Wolfe, Los Gatos, CA (US)

(73) Assignee: Empire Technology Development LLC, Wilmington, DE (US)

( * ) Notice: Subject to any disclaimer, the term of this patent is extended or adjusted under 35 U.S.C. 154(b) by 703 days.

This patent is subject to a terminal disclaimer.

(21) Appl. No.: 12/429,539

(22) Filed: Apr. 24, 2009

(65) Prior Publication Data

US 2010/0274879 A1    Oct. 28, 2010

(51) Int. Cl.
G06F 13/24 (2006.01)
(52) U.S. Cl. .................... 710/267; 710/265
(58) Field of Classification Search ........... 710/262–269
See application file for complete search history.

(56) References Cited

U.S. PATENT DOCUMENTS

| | | | |
|---|---|---|---|
| 4,047,161 A | 9/1977 | Davis | |
| 4,482,954 A | 11/1984 | Vrielink et al. | |
| 4,779,194 A | 10/1988 | Jennings et al. | |
| 4,964,040 A | 10/1990 | Wilcox | |
| 5,065,310 A * | 11/1991 | Stone ............................ | 718/100 |
| 5,179,707 A | 1/1993 | Piepho | |
| 5,283,904 A | 2/1994 | Carson et al. | |
| 5,313,584 A | 5/1994 | Tickner et al. | |
| 5,371,872 A * | 12/1994 | Larsen et al. ................. | 711/118 |
| 5,379,428 A | 1/1995 | Belo | |
| 5,410,710 A | 4/1995 | Saragdhar et al. | |
| 5,452,452 A | 9/1995 | Gaetner et al. | |
| 5,555,420 A | 9/1996 | Sarangdhar et al. | |
| 5,564,060 A | 10/1996 | Mahalingaiah et al. | |
| 5,613,128 A | 3/1997 | Nizar et al. | |
| 5,646,676 A | 7/1997 | Dewkett et al. | |
| 5,889,978 A | 3/1999 | Jayakumar | |
| 5,918,057 A | 6/1999 | Chou et al. | |
| 5,944,809 A | 8/1999 | Olarig et al. | |
| 6,148,361 A | 11/2000 | Carpenter et al. | |

(Continued)

FOREIGN PATENT DOCUMENTS

CN 100349147 C 11/2007

(Continued)

OTHER PUBLICATIONS

U.S. Official Action dated Jun. 8, 2010 in U.S. Appl. No. 12/423,368.
U.S. Official Action dated Jul. 15, 2011 in U.S. Appl. No. 12/578,270.
U.S. Notice of Allowance / Allowability dated Mar. 25, 2011 in U.S. Appl. No. 12/423,368.

(Continued)

*Primary Examiner* — Paul R Myers
(74) *Attorney, Agent, or Firm* — Hope Baldauff Hartman, LLC

(57) ABSTRACT

Technologies are generally described herein for handling interrupts within a multiprocessor computing system. A priority level associated with a current task for each processor of the multiprocessor computing system can be maintained. Cache state information associated with each processor can also be maintained. Upon receiving an interrupt to the multiprocessor computing system, a cache locality score for each processor can be determined based on the maintained cache state information. A value can be computed that balances, for each processor, the priority level and the cache locality score. A processor for servicing the interrupt can be determined based on the computed value. The determined processor can be signaled to service the interrupt. Tracking state information related to processor cores can support rapid allocation of an arriving interrupt to a processor core without collecting processor core state information at interrupt time.

18 Claims, 8 Drawing Sheets

U.S. PATENT DOCUMENTS

| | | | |
|---|---|---|---|
| 6,205,508 B1 | 3/2001 | Bailey et al. | |
| 6,219,690 B1 | 4/2001 | Slingwine et al. | |
| 6,418,497 B1 | 7/2002 | Guthrie et al. | |
| 6,779,065 B2 | 8/2004 | Murty et al. | |
| 6,983,339 B1 | 1/2006 | Rabe et al. | |
| 6,996,745 B1 | 2/2006 | Shaylor | |
| 7,003,611 B2 | 2/2006 | Arndt | |
| 7,039,740 B2 | 5/2006 | Glasco et al. | |
| 7,117,285 B2 | 10/2006 | Ota | |
| 7,191,349 B2 | 3/2007 | Kaushik et al. | |
| 7,197,627 B1 | 3/2007 | Naylor | |
| 7,328,294 B2 | 2/2008 | Kim et al. | |
| 7,350,005 B2 | 3/2008 | Yiu et al. | |
| 7,386,002 B2 | 6/2008 | Meier | |
| 7,461,215 B2 | 12/2008 | Hass | |
| 7,581,052 B1 | 8/2009 | Solomita | |
| 7,594,234 B1 * | 9/2009 | Dice | 718/108 |
| 7,627,706 B2 | 12/2009 | Kaushik et al. | |
| 7,634,642 B2 * | 12/2009 | Hochschild et al. | 712/228 |
| 7,685,347 B2 | 3/2010 | Gibbs | |
| 7,809,876 B2 | 10/2010 | Balasubramanian | |
| 7,899,966 B2 | 3/2011 | Kulkarni | |
| 2002/0062381 A1 | 5/2002 | Gargiulo et al. | |
| 2002/0087775 A1 | 7/2002 | Looi et al. | |
| 2003/0101301 A1 | 5/2003 | Taniguchi | |
| 2005/0010707 A1 | 1/2005 | Francis | |
| 2006/0026322 A1 | 2/2006 | Chauvel et al. | |
| 2006/0200826 A1 | 9/2006 | Tamura et al. | |
| 2007/0106827 A1 | 5/2007 | Boatright et al. | |
| 2007/0256076 A1 | 11/2007 | Thompson et al. | |
| 2008/0140896 A1 | 6/2008 | Todoroki et al. | |
| 2009/0089470 A1 | 4/2009 | Ven | |
| 2009/0204932 A1 | 8/2009 | Bormann et al. | |
| 2009/0248934 A1 | 10/2009 | Ge et al. | |
| 2009/0320031 A1 | 12/2009 | Song | |
| 2009/0327556 A1 | 12/2009 | Railing et al. | |
| 2010/0262742 A1 | 10/2010 | Wolfe | |
| 2010/0274941 A1 | 10/2010 | Wolfe | |
| 2010/0287556 A1 | 11/2010 | Munz | |
| 2011/0087815 A1 | 4/2011 | Kruglick | |

FOREIGN PATENT DOCUMENTS

| | | |
|---|---|---|
| EP | 0 602 858 A1 | 6/1994 |
| EP | 0 685 798 A2 | 12/1995 |
| EP | 0 827 084 A2 | 3/1998 |
| EP | 2 241 979 A1 | 10/2010 |
| JP | 2000-029719 A | 10/2001 |
| JP | 2001-290660 A | 10/2001 |
| WO | WO 95/18416 A1 | 7/1995 |
| WO | 2004061686 A2 | 7/2004 |

OTHER PUBLICATIONS

Goutanis et al., "A method of processor selection for interrupt handling in a multiprocessor system," Dec. 1966, Proceedings of the IEEE, 54(12): 1812-1819.

Jeffay et al., "Accounting for interrupt handling costs in dynamic priority task systems," Dec. 1-3, 1993, Proceeding of the Real-Time Systems Symposium, pp. 212-221.

Manner, R., "Hardware task/processor scheduling in a polyprocessor environment," Jul. 1984, IEEE Transactions on Computers, C-33(7): 626-636.

Qu et al., "Design and implementation of RTU based on the embedded operation system μC/OS-II," Apr. 5-8, 2008, Proceedings of the 2004 IEEE International Conference on Electric Utility Deregulation, Restructuring and Power Technologies, vol. 2, pp. 623-626.

U.S. Official Action dated Aug. 25, 2010 in U.S. Appl. No. 12/423,368.

European Search Report dated Jul. 2, 2010 in EP U.S. Appl. No. 10154704.0.

Intel, "Protection," Intel® 64 and IA-32 Architectures Software Developer's Manual, vol. 3A, System Programming Guide, Part1, Chapter 5, Sep. 2009, 50 pages.

Intel, Intel® 64 Architecture x2APIC Specification, Sep. 2007, 39 pages.

Intel, Intel® 64 Architecture x2APIC Specification, Jun. 2008, 49 pages.

U.S. Official Action dated Nov. 26, 2010 in U.S. Appl. No. 12/423,368.

U.S. Official Action dated Jan. 21, 2011 in U.S. Appl. No. 12/578,270.

U.S. Official Action dated Nov. 29, 2011 in U.S. Appl. No. 12/578,270.

U.S. Official Action dated Dec. 15, 2011 in U.S. Appl. No. 12/429,580.

International Search Report and Written Opinion dated Feb. 9, 2012 in PCT Application No. PCT/US10/52244.

U.S. Official Action dated Mar. 27, 2012 in U.S. Appl. No. 12/429,580.

Cesário, W., et al., "Component-Based Design Approach for Multicore SoCs," Proceedings of the 39th Conference on Design Automation, Jun. 10-14, 2002, pp. 6.

Raj, H. and Schwan, K., "Implementing a Scalable Self-Virtualizing Network Interface on an Embedded Multicore Platform," pp. 6, 2005.

Smolens, J.C., et al., "Reunion: Complexity-Effective Multicore Redundancy," Proceedings of the 39th Annual IEEE/ACM International Symposium on Microarchitecture, 2006, pp. 12.

U.S. Notice of Allowance dated Apr. 18, 2012 in U.S. Appl. No. 12/578,270.

* cited by examiner

400

CURRENT TASK PRIORITY LEVEL 410

| CORE | PRIORITY LEVEL |
|---|---|
| 0 | 6 |
| 1 | 5 |
| 2 | 3 |
| 3 | 7 |

CACHE VALIDITY 420

| TAG | CORE 0 | CORE 1 | CORE 2 | CORE 3 |
|---|---|---|---|---|
| 0x200FFFX | 0 | 0 | 1 | 1 |
| 0x200AFFX | 0 | 1 | 1 | 1 |
| 0x4401FFFX | 0 | 0 | 0 | 0 |

CACHE LOCALITY SCORE 430

| TAG | CORE 0 | CORE 1 | CORE 2 | CORE 3 |
|---|---|---|---|---|
| 0x200FFFX | 0 | 0 | 1 | 3 |
| 0x200AFFX | 0 | 0 | 1 | 1 |
| 0x4401FFFX | 1 | 1 | 0 | 0 |

FIG. 4

DYNAMIC SCHEDULING INTERRUPT CONTROLLER FOR MULTIPROCESSORS

BACKGROUND

Interrupts can signal a computing system of an event to be serviced by the execution of an interrupt handler, which may also be known as an interrupt service routine (ISR). Such a signal event can be referred to as an interrupt request (IRQ). A processor can undergo a context switch to transition from its current task to execute the interrupt handler associated with a received interrupt. A transition from the current processor task can be considered an interruption of the current task. Allocating a received interrupt to a particular processor or processor core for execution within a multiprocessor computing system can present additional complications. It is with respect to these considerations and others that the disclosure made herein is presented.

BRIEF DESCRIPTION OF THE FIGURES

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 4 is a data structure diagram illustrating core processor state information used by an interrupt controller;

DETAILED DESCRIPTION

Figure 1:
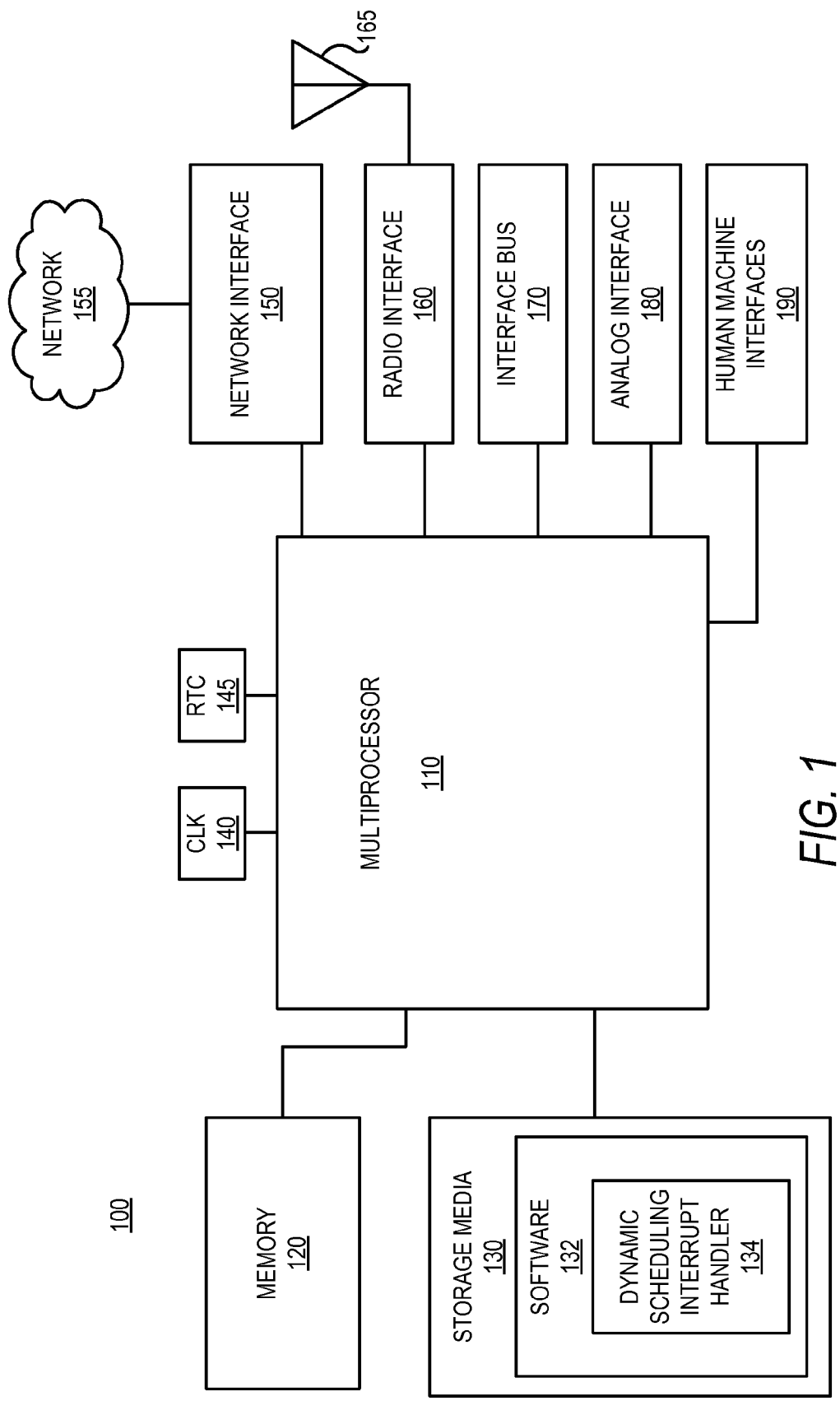
FIG. 1 is a block diagram illustrating an operating environment for a multiprocessor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The following disclosure is drawn, inter alia, to methods, apparatus, systems and computer program products related to technologies for allocating an interrupt to a specific processor core within a multiprocessor. Through the use of the technologies and concepts presented herein, an interrupt controller can dynamically assign an interrupt to a processor core based on an evaluation of various measures of processor core availability and the location of cached data and instructions related to the interrupt handler for the interrupt. Referring now to the drawings, in which like numerals represent like elements through the several figures, aspects of interrupt optimization within multiprocessor systems are described.

Technologies described herein are generally related to handling interrupts within a multiprocessor computing system. A priority level associated with a current task for each processor of the multiprocessor computing system can be maintained. Cache state information associated with each processor can also be maintained. When an interrupt to the multiprocessor computing system is received, a cache locality score for each processor can be determined based on the maintained cache state information. A value can be computed that balances, for each processor, the priority level and the cache locality score. A processor for servicing the interrupt can be determined based on the computed value. The determined processor can be signaled to service the interrupt. Tracking state information related to processor cores can support rapid allocation of an interrupt to a processor core without delaying to collecting state information from the processor cores at interrupt time.

Turning now to FIG. 1, a functional block diagram 100 illustrates an operating environment for a multiprocessor 110 according to embodiments presented herein. A multiprocessor 110 can incorporate multiple processors or processor cores. The multiple cores can generally support parallel processing, parallel tasks, parallel threads, separate sequential processes, or any combination thereof. A memory 120 may be accessed by the multiprocessor 110. The multiprocessor 110 may read from and write to the memory 120. Such reads and writes may relate to both instructions and data associated with operations of the multiple cores of the multiprocessor 110. Generally, each of the processor cores within the multiprocessor 110 may individually access the memory 120. The memory 120 may be random access memory (RAM), static RAM (SRAM), dynamic RAM (DRAM), synchronous DRAM (SDRAM), or any type of volatile or non-volatile memory.

Instructions and data associated with operations on the multiple cores of the multiprocessor 110 may be stored on a storage media 130 device or devices. The storage media 130 may support the nonvolatile storage of information. The storage media 130 may be accessed by the multiple processor cores within the multiprocessor 110. The storage media 130 can store software 132 for execution on the multiple processor cores within the multiprocessor 110. By way of example, and not limitation, computer-readable media may comprise computer storage media and communication media. Computer storage media may include volatile, non-volatile, removable, and non-removable media implemented in any method or technology for the storage of information such as computer-readable instructions, data structures, program modules, or other data. Computer storage media may include, but is not limited to, RAM, read only memory (ROM), erasable programmable ROM (EPROM), electronically erasable programmable ROM (EEPROM), flash memory, other solid state memory technology, compact disc ROM (CD-ROM), digital versatile disc (DVD), high-definition DVD (HD-DVD), BLU-RAY Disc, other optical storage, magnetic cassettes, magnetic tape, magnetic disk storage, other magnetic storage devices, or any other medium which can be used to store the desired information and which can be accessed by the multiprocessor 110.

Software 132, or other instructions, code, modules, or programs associated with the multiprocessor 110 may include modules for responding to interrupt events. Such a module may be referred to as an interrupt service routine (ISR) or a dynamic scheduling interrupt handler 134. The dynamic scheduling interrupt handler 134 can be configured to support the dynamic scheduling of interrupts as presented herein. The interrupt handler 134 may be executed in response to receiving the associated interrupt at the multiprocessor 110. The interrupt handler 134 may be associated with a specific interrupt event, a specific cause of interrupt, source of interrupt, or a specific interrupt signal line. The interrupt handler 134 may interrupt, or preempt, other operations associated with the multiprocessor 110. Such preemption may support executing the interrupt handler 134 in rapid response to the arrival of an interrupt at the multiprocessor 110. Rapid response can support real-time, hard-real-time, soft-real-time, or near-real-time operation of various software modules. One example of an interrupt handler 134 module may be associated with a device driver, or other software, firmware, or modules associated with supporting external devices. In addition to external devices, such modules may support internal circuit blocks that provide interrupts. The supported device, or an associated interface circuit, may be considered a source of an interrupt associated with the device driver, ISR, or interrupt handler 134. Upon receiving an interrupt signal, the associated interrupt hander 134 may be executed immediately, within a specific time limit, or according to a priority level associated with the interrupt handler 134 and other operations.

An external clock 140 can provide a clock signal to the multiprocessor 110. The external clock 140 may include a crystal oscillator or any other clock or oscillator source. The external clock 140 may include a clock driver circuit. The clock signal associated with the external clock 140 may be used to time and synchronize various circuits within the multiprocessor 110. The multiprocessor 110 may also interface to a real time clock (RTC) 145. The real time clock 145 can be used for maintaining human time, such as time of day, day of week, calendar date, year, and so forth. An RTC 145 may generate interrupt events to the multiprocessor 110 related to timers, alarms, or watchdog circuits.

Various devices that interface to the multiprocessor 110 can generate interrupts. Such interrupts can signal to the multiprocessor 110 that service is requested in response to the interrupt. An interrupt handler 134 may be executed to service the interrupt for the device. As non-limiting examples, several different devices are illustrated in FIG. 1. For example an interrupting device may be a network interface 150. The network interface 150 can be used to attach to a network 155. The network interface 150 may generate an interrupt when a data packet is received from the network 155. An interrupt handler 134 associated with the network interface 150 may then be executed to receive the data packet from the network interface 150. Similarly, a radio interface 160 may use an antenna 165 to send and receive wireless data packets to a wireless network or a mobile communications system.

One or more interface buses 170 may also interface to the multiprocessor 110. Examples of interface buses can include Industry Standard Architecture (ISA) bus, Peripheral Component Interconnect (PCI) bus, PCI-Express bus, Accelerated Graphics Port (AGP) bus, Universal Serial Bus (USB), Advanced Technology Attachment (ATA) bus, Serial ATA (SATA) bus, Small Computer System Interface (SCSI), and other such buses and interfaces used in computers and embedded processor systems. The buses, or interface circuits associated with the buses, may incorporate one or more interrupt mechanisms for interrupting the multiprocessor 110. Analog interfaces 180 may connect to the multiprocessor 110. The analog interfaces 180 may include digital to analog converters, analog to digital converters, or both. The analog interfaces 180 may be used for video, audio, infrared, radar, or any other analog signal. The analog interfaces 180, or circuitry supporting the analog interfaces 180, may generate interrupts to the multiprocessor 110. One or more human machine interfaces 190 may connect to the multiprocessor 110. Human machine interfaces 190 may include video displays, keyboards, mice, light pens, projectors, speech recognition, switches, buttons, indicators, or any other mechanisms for receiving input from a human or providing output to a human. The human machine interfaces 190, or circuitry associated therewith, may provide interrupts to the multiprocessor 110.

Figure 2:
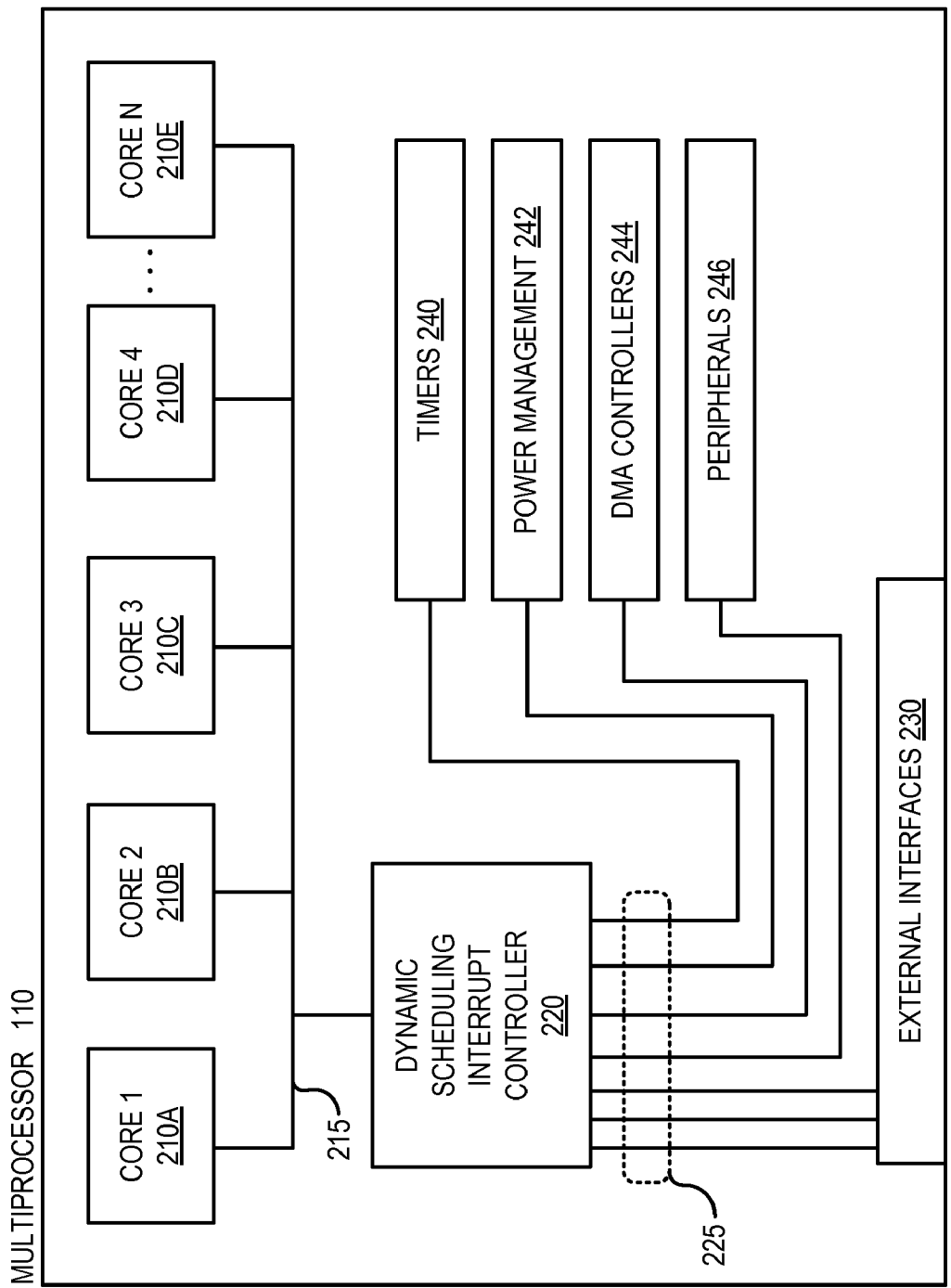
FIG. 2 is a block diagram illustrating a multi-core processor having an interrupt controller.

Turning now to FIG. 2, a block diagram illustrates a multi-core processor having an interrupt controller according to embodiments presented herein. A multiprocessor 110 may have multiple internal processor cores such as core 1 through core N 210A-210E. These may be referred to collectively, or generally, as processor cores 210. Interrupts arriving to the multiprocessor 110 may come from external interfaces 230. Interrupts associated with the external interfaces 230 may originate from external devices as discussed with respect to FIG. 1. Similarly, devices internal to the multiprocessor 110 may generate interrupts. For example, timers 240, power management mechanisms 242, direct memory access (DMA) controllers 244, or other on-chip peripherals 246 may generate interrupts similar to interrupts originating from the external interfaces 230.

Various interrupt signals from internal devices and the external interfaces 230 may be carried individually on interrupt lines 225 to a dynamic scheduling interrupt controller 220. Each of the interrupt lines 225 may be associated with a separate dynamic scheduling interrupt handler 134 or more than one of the interrupt lines 225 may be associated with a dynamic scheduling interrupt handler 134. The interrupt controller 220 can interface with the processor cores 210 over an interrupt bus 215. The interrupt bus 215 can be a serial bus, a parallel bus, or any channel for communicating signals between the interrupt controller 220 and the multiple processor cores 210. The interrupt bus 215 may be a general-purpose system bus, an input/output (I/O) bus, or a memory bus. The interrupt bus 215 may also be used for communicating signals between the interrupt controller 220 and the multiple processor cores 210. The interrupt bus 215 can carry messages relating interrupt information between the interrupt controller 220 and the processor cores 210. The messages communicated on the interrupt bus 215 can be encoded as signals, pulses, logic levels, packets, frames, or any other representation known in the art.

An interrupt can delay a currently executing process by preempting processor execution resources. Swapping from the current task to the interrupt handler 134 can occur by a context switch. A context switch may cause operations to complete out of order. A context switch may cause operations to be aborted and re-executed. A context switch may cause internal buffers be cleared, or caches to be altered. Cache lines and translation lookaside buffer (TLB) entries may be invalidated by the code or data from the interrupt handler 134. Caches can maintain recently accessed data or code in a faster cache memory for rapid subsequent access. This may be beneficial as the notions of repeated access and locality of reference imply that recently accessed memory locations, or those nearby, may be likely candidates for access again in the near future. Interrupt response latency and interrupt processing time may be delayed if code or data associated with the interrupt handler 134 are cached in a modified state on another processor core.

Disruptive effects may be increased in systems where interrupts are frequent; where interrupt service routines involve substantial amounts of code or data; or when a substantial amount of overall computing time is devoted to servicing interrupts. Such conditions can occur in either general-purpose or special-purpose computing systems where there are complex computing tasks involving large amounts of data tied to a real-time schedule. Similar conditions may appear in server computers that are processing large amounts of network traffic or storage system I/O operations. Embedding computing systems are special purpose computing systems embedded within devices or systems often supporting control and communications functions. For example, embedded processors may be applied to engine controllers, robotic controllers, communication devices, modems, mobile phones, remote controls, and a myriad of other applications known in the art. Embedding computing systems may perform much of their computing time responding to interrupts. Thus, the present disclosure recognizes that the efficiency of multiprocessor 110 operations within an embedded environment may benefit substantially from improved techniques for allocating resources to interrupts in an effective and efficient manner.

Interrupts may be periodic or at least be repeatedly executed within a computing system. The same code and data may commonly be used in each instance of executing a specific interrupt handler 134. Improved efficiency in executing the interrupt handler 134 may be supported where code and data resources are already allocated to responding processor core. This pre-allocation may also involve the code or data already being cached at the responding processor core thereby incurring improved cache efficiencies. Thus, the present disclosure recognizes that allocating the execution of a specific interrupt handler 134 to the processor core that handled the previous instance of that interrupt handler 134 can improve efficiency.

Unfortunately, the processor core that executed the previous instance of a specific interrupt handler 134 may be busy executing a task when the interrupt arrives. This task can be referred to as the current task of the processor core. If the current task is a high priority task, context switching to execute the interrupt handler 134 may be delayed or prohibitively disruptive. If the current task of the processor is a low priority task, the current task may be preempted or delayed in order to execute the interrupt handler 134. In either case, other processor cores may be idle or executing even lower priority tasks and therefore assigning the interrupt to one of the other processors may support improved system efficiency over preempting, or waiting on, the preferred processor. Such allocation of the interrupt to a specific processor core can balance the caching efficiency of executing the interrupt handler 134 on the processor that previously executed the interrupt handler 134 against the benefits of assigning execution of the interrupt hander 134 to another processor that is currently idle or at least currently processing the lowest priority task. A score, or cost, can be established by adding, combining, or weighting together these two factors for interrupt allocation.

Figure 3:
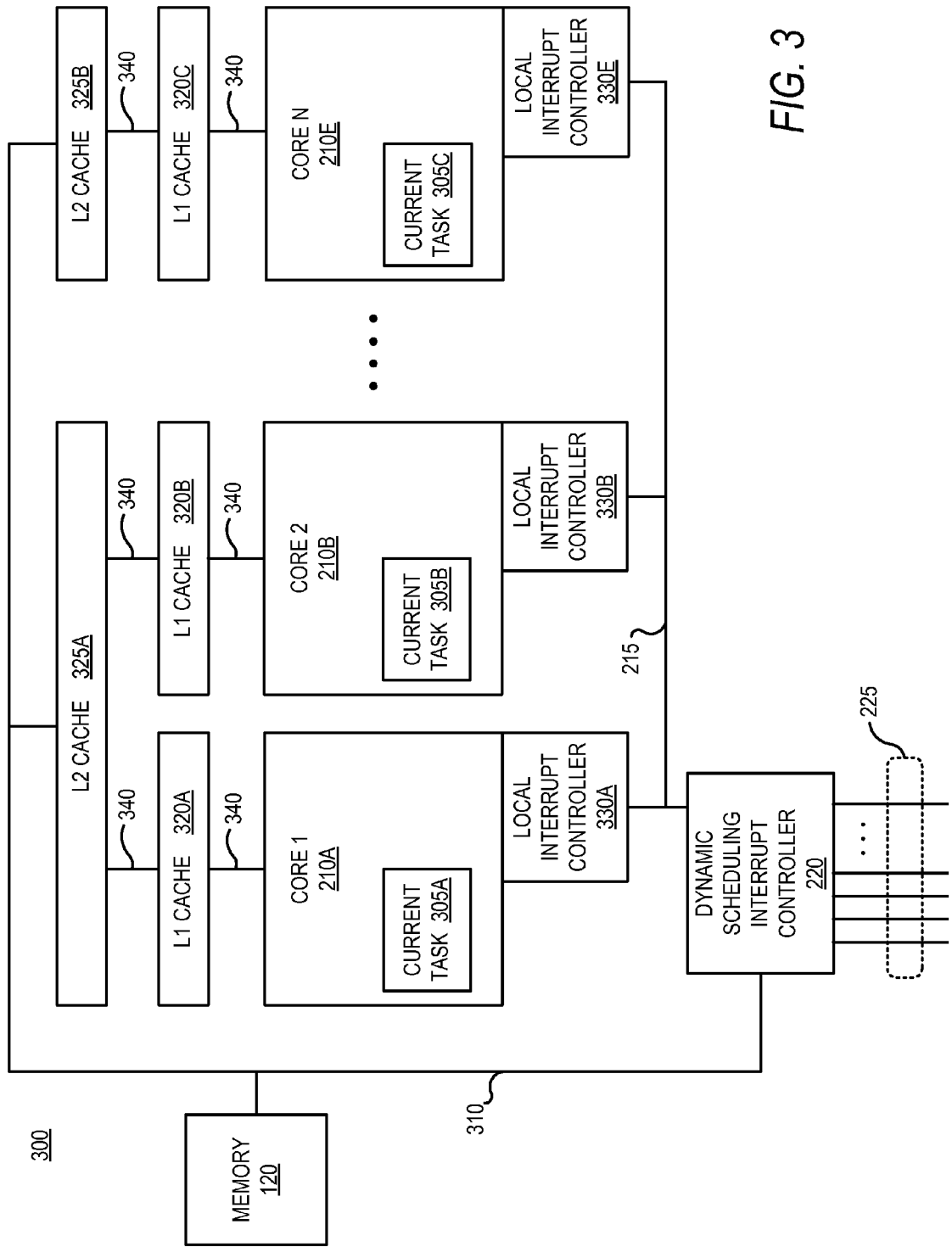
FIG. 3 is a block diagram illustrating an interrupt controller within a multi-core processor.

Turning now to FIG. 3, a block diagram 300 illustrates an interrupt controller 220 within a multi-core processor according to aspects of embodiments presented herein. An interrupt controller 220 can receive and latch interrupt requests arriving on one or more interrupt lines 225. In response to an interrupt request event, the interrupt controller 220 can identify which processor core 210 may execute the interrupt handler 134 thus servicing the interrupt. The interrupt controller 220 can monitor various state information associated with the multiprocessor system. From monitoring this state information, the interrupt controller 220 can determine and store local representations of system state information related to the multiprocessor 110. These representations may be copies of, or estimators of, state information within the multiprocessor 110.

State information related to the processor cores 210 can be related to priority levels, caching, or other relevant state information regarding the desirability of servicing an interrupt with a particular processor core 210. Each processor core 210 can have an L1 cache 320A-320C. The L1 caches 320A-320C are a first level of cache and may be referred to collectively, or generally, as L1 cache 320. Each processor core 210 can also have an L2 cache 325A-325B. The L2 caches 325A-325B are a second level cache and may be referred to collectively, or generally, as L2 cache 325. L2 cache 325 may be shared between processor cores as illustrated by L2 cache 325A or L2 cache 325 may be dedicated to one processor core as illustrated by L2 cache 325B. The L1 cache 320 may store code or data that has been recently accessed from the memory 120. Page table information may also be cached as TLB entries in a TLB or in the caches. The L2 cache 325 may store cache entries that have expired from L1 cache 320 but are still recent enough to maintain caching. Generally an L1 cache 320 may be smaller and faster than an L2 cache 325. Fewer or additional layers of caching may also be used as known in the art. At each level separate cache blocks, lines, or areas may be used for code, data, and TLB entries. These caching areas may also share cache memory space in any combination.

The processor cores 210 may each execute a current task 305A-305C. The current tasks 305A-305C may also be referred to collectively, or in general, as current tasks 305. The interrupt controller 220 can monitor and store information representing priority levels of the current tasks 305 on each processor core 210. This can be accomplished by having the operating system code, responsible for task switching, write the current task priority to the interrupt controller 220 each time a task is set to begin execution. In some examples task switching, or thread switching, can be performed by hardware or some combination of hardware and software, the circuits or modules responsible for the switching tasks can signal, or write, the current task priority to the interrupt controller 220. In some additional examples the interrupt bus 215 or dedicated signal lines from each processor core 210 to the interrupt controller 220 can be arranged to indicate the current priority level of the currently executing task, or thread. In some further examples, a default value indicating a lowest possible priority may be used to indicate that the processor core 210 is idle.

The state information maintained at the interrupt controller 220 can be used to determine which processor cores 210 are idle or are executing low priority tasks. The interrupt controller 220 may be arranged to use the locally stored copies of this current task priority information to select a processor core 210 for servicing an interrupt. The selected processor core 210 may be idle or may have the lowest current task priority level. The interrupt controller 220 can be configured to send a message to a local interrupt controller 330 corresponding to the selected processor core 210. The message can indicate which interrupt requires service and can instruct the selected processor core 210 to service the interrupt. This approach can be used to quickly assign the interrupt to a processor core 210 and may be used to support reducing impact on currently executing tasks 305.

The interrupt controller 220 can be arranged to dynamically assign an interrupt to a processor core 210 based on a minimum cost of executing the interrupt service handler 134. The interrupt controller 220 can be initialized to respond to each particular interrupt. During the initialization process, a data structure, or similar memory or circuit, can be created for each interrupt. In some examples, the structure can be used to track whether any code associated with the interrupt handler 134 is currently cached at each processor core 210. In some additional examples, the structure can be used to track whether any data associated with the interrupt handler 134 is currently cached at each processor core 210. The structure can also be used to track whether any TLB entries corresponding to code or data associated with the interrupt handler 134 is currently cached at each processor core 210. The structure can represent each cache line, or cache page, associated with the interrupt handler 134, or it can be estimated by a representative set. The structures can be stored in a memory, maintained by dedicated hardware, or any combination thereof. The structures can be organized by cache tags, virtual addresses, physical addresses, or any other reasonable cache organizing mechanism.

In some implementations, the interrupt controller 220 can be arranged to monitor transactions on the system bus 310 to track the current cache state for each line or page of interest. In the case where, for example, an L2 cache 325 is shared between cores, the status of both the L1 cache 320 and L2 cache 325 can be monitored by the interrupt controller 220. Such detailed cache monitoring may involve monitoring cache buses 340 in addition to monitoring the system bus 310. Each cache can be tracked independently. In some examples a scoring system can be used where presence in an L1 cache 320 is weighted more heavily than presence in an L2 cache 325.

The interrupt controller 220 can be configured to compute a locality score for each processor core 210, where the locality score indicates how much of the code and data associated with the interrupt handler 134 is cached by each core. In some examples, the locality score can be a percentage of tracked code and data cache lines that are valid in the L1 cache 320 associated with each processor core 210. Another example scoring function can involve a weighed sum of the percentages of valid cache lines in L1 cache 320, L2 cache 325, TLB entries, or any combination thereof. A processor core 210 that achieves a high locality score can be selected by the interrupt controller 220 to service the pending interrupt. For example, a message can be sent from the interrupt controller 220, over the interrupt bus 215, to a local interrupt controller 330 associated with the assigned core. This example message can indicate the interrupt and request that the processor core 210 service the interrupt.

Alternatively, both approaches of lowest priority and highest locality score can be used together to assign the interrupt to a processor core. A mathematical function may be used to combine the lowest priority with the highest locality score. For example, the locality score for each processor core can be normalized to a range equal to the range of possible priority levels and then the current task priority level can be subtracted from that score. This would produce a combined score that can be used to select which processor core 210 services the interrupt. Other relationships for combining the two factors would be clear to one of ordinary skill in the art having read the present disclosure.

In some implementations, the interrupt controller 220 and various local interrupt controllers 330 can be implemented as modules or circuits within the same integrated circuit supporting the processor cores 210. Such an integrated circuit may be referred to as a multiprocessor 110. In some other implementations, the interrupt controller 220 and various local interrupt controllers 330 may be implemented as modules or circuits in a separate integrated circuit from the processor cores 210. The processor cores 210 may also be implemented as separate individual processors, or in some other examples the processor cores 210 may be implemented as an integrated circuit.

The integrated circuits discussed herein can be application specific, programmable integrated circuits (ASICs) such as field programmable gate arrays (FPGA), systems on chip (SOC), system on substrate, system on package, or implemented in any other approach for integrating or packaging circuitry. While illustrated and discussed as separate modules or circuits, the interrupt controller 220, interrupt request arbiter 310, and various local interrupt controllers 330 may be functionally combined in any combination or partitioned differently without departing from the spirit and scope of the technology disclosed herein. Together, the interrupt controller 220, interrupt bus 215, various local interrupt controllers 330, in any combination, or any subset thereof may be referred to as an interrupt allocation system.

Turning now to FIG. 4, a data structure diagram 400 illustrates core processor state information used by an interrupt controller according to embodiments presented herein. An interrupt controller 220 can be configured to maintain data structures, similar memory structures, or circuits for information related to each core processor 210. These structures can be arranged to maintain state information related to the processor cores 210 such as priority levels, or cache memory state. The structures can be stored in a memory, maintained by dedicated hardware, or using any other reasonable approach for storing information.

Tracking state information related to the processor cores 210 at the interrupt controller 220 can support a rapid allocation of an arriving interrupt to a processor core 210 by the interrupt controller 220. Transactions between the interrupt controller 220 and the processor cores 210 to determine which processor core can best service an arriving interrupt can be substantially avoided at interrupt time if the state information, or estimates thereof, is already maintained at the interrupt controller 220.

A current task priority level structure 410 can be used to record the priority level of the current task 305 executing at each processor core 210. For the example illustrated in FIG. 4, priority levels of 6, 5, 3, and 7 can be assigned to core 0 through core 3, respectively. The interrupt controller 220 can gather this information by various monitoring or reporting techniques discussed with respect to FIG. 3. A default priority level value indicating a lowest possible priority may be used to indicate that a processor core 210 is currently idle.

A cache validity structure 420 can be maintained by the interrupt controller 220 to track cache state information at the processor cores 210 as it relates to the interrupt handlers 134. The cache validity structure 420 can be used to track whether any code, data, or related TLB entries that are associated with a specific interrupt handler 134 are currently cached at each processor core 210. The cache validity structure 420 can be organized by caching units, such as cache lines or cache pages, for locations in memory 120 associated with code or data that may be related to the interrupt handler 134. The cache validity structure 420 can be organized by cache tags, virtual addresses, physical addresses, or any other cache organizing mechanism known in the art. Entries in the cache validity structure 420 can also track TLB entries for addresses related to code or data for the interrupt handler 134.

For each tracked cache entry within the cache validity structure 420, a flag can be maintained for each core processor 210 such that the flag can be set if the cache entry is valid, where validity can imply that the respective code, data, or TLB is currently cached at that processor core 210. Similarly, a validity flag can be cleared if the respective code, data, or TLB is not cached at that processor core 210. For the example illustrated in FIG. 4, a validity flag associated with cache tag 0x200FFFX can be cleared for cores 0 and 1 and set for cores 2 and 3. A validity flag associated with cache tag 0x200AFFX can be cleared for core 0 and set for cores 2, 3 and 4. A validity flag associated with cache tag 0x4401FFFX can be cleared for cores 0 through 3.

The cache validity information tracked using the cache validity structure 420 can be collected by the interrupt controller 220. The interrupt controller 220 can monitor transactions on the system bus 310 to track the current cache state for each cache line or cache page of interest. The cache monitoring may involve monitoring cache buses 340 in addition to monitoring the system bus 310.

Cache validity information, such as that tracked using the cache validity structure 420 can be used to determine which processor core 210 already has code, data, or TLB entries associated with a given interrupt handler 134 cached at the processor core 210. A processor core 210 having a local cache of more of the required resources for an interrupt hander 134 can imply that the processor core 210 can execute the interrupt handler 134 at a reduced cost to system performance.

When an interrupt occurs, the interrupt controller 220 can compute values associated with a cache locality score structure 430. The locality scores may be based on the flags set in the various instances of the cache validity structure 420 maintained by the interrupt controller 220. A locality score for each processor core 210 can indicate how much of the code and data associated with an interrupt handler 134 is cached by each core. In some examples, the locality score can be a percentage of tracked code and data cache lines that are valid in the L1 cache 320 associated with each processor core 210. In some other examples, the scoring function can involve a weighed sum of the percentages of valid cache lines in L1 cache 320, L2 cache 325, TLB entries, or any combination thereof. A processor core 210 having a high locality score may be preferred for servicing a pending interrupt since cache locality can imply that the processor core 210 can execute the associated interrupt handler 134 at a reduced cost.

For the example illustrated in FIG. 4, a cache locality score associated with cache tag 0x200FFFX can have a value of zero for cores 0 and 1, a value of one for core 2, and a value of 3 for core 3. A cache locality score associated with cache tag 0x200AFFX can have a value of zero for cores 0 and 1, and a value of one for cores 2 and 3. A cache locality score associated with cache tag 0x4401FFFX can have a value of one for cores 0 and 1, and a value of zero for cores 2 and 3.

Figure 5:
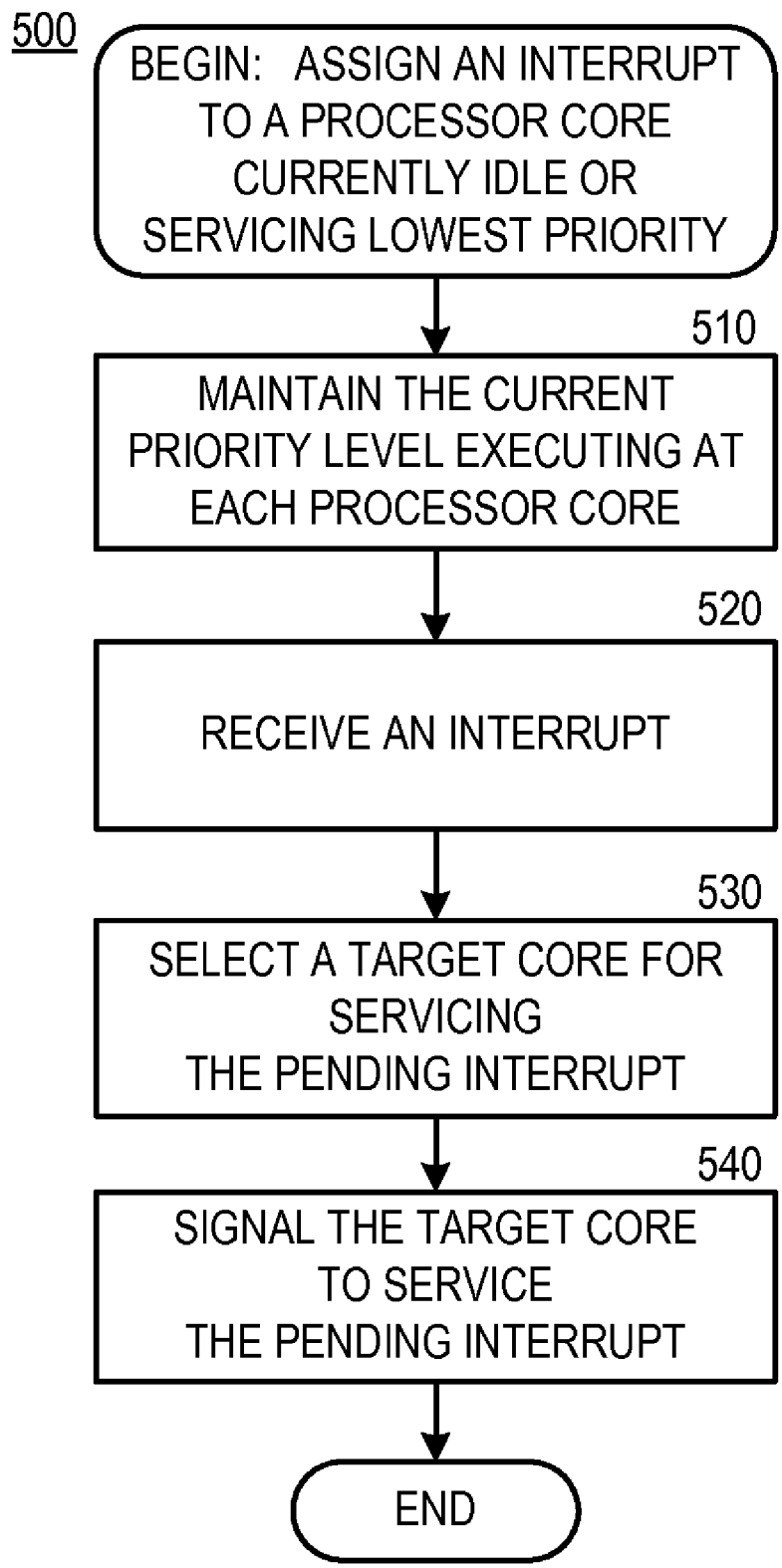
FIG. 5 is a flow diagram illustrating a process for assigning an interrupt to a processor core that is currently idle or servicing a lowest priority task.

Referring now to FIG. 5, additional details will be provided regarding the embodiments presented herein for allocation of interrupts within multiprocessors. In particular, FIG. 5 is a flow diagram illustrating aspects of a process 500 for assigning an interrupt to a processor core that is currently idle or servicing a lowest priority task according to aspects of embodiments presented herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as state operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed sequentially, in parallel, or in a different order than those described herein.

The process 500 can begin at operation 510, where a priority level for each processor core 210 can be maintained based upon the priority level of the current task 305 executing at each processor core 210. Such priority level information may be maintained at the interrupt controller 220 within a current task priority level structure 410. A default priority level value indicating a lowest possible priority may be used to indicate that a processor core 210 is currently idle.

Next at operation 520, an interrupt associated with a specific interrupt handler 134 is received. The received interrupt can arrive on interrupt lines 225 to the interrupt controller 220. At operation 530, the interrupt controller 220 can select a processor core 210 for executing the interrupt service handler 134 associated with the pending interrupt. The selection of the processor core 210 can be made based on priority level information tracked within the current task priority level structure 410 by operation 510. For example, a processor core 210 having a lower priority level may be assigned the task of servicing the pending interrupt by executing the interrupt handler 134. A processor core 210 may have a lower priority level because the processor core has a default priority level value indicating that the processor core 210 is currently idle. According to embodiments, this default priority level can be the lowest possible priority used for a processor core 210. Servicing the interrupt at a processor core 210 that is idle or executing a current task 305 with a low priority may have a reduced negative impact on system performance instead of preempting or interrupting a higher priority current task 305 on another processor core 210.

At operation 540, the selected processor core 210, or target core, as determined at operation 530 can be signaled to execute the interrupt handler 134 to service the pending interrupt. The signaling may occur over bus lines, using dedicated signal lines, as a message on an interrupt bus 215, or by any other signaling mechanism as would be appreciated by one of ordinary skill in the art. The selected processor core 210 can resume execution of its current task 305 once execution of the interrupt handler 134 is complete. The process 500 can terminate after operation 540.

Figure 6:
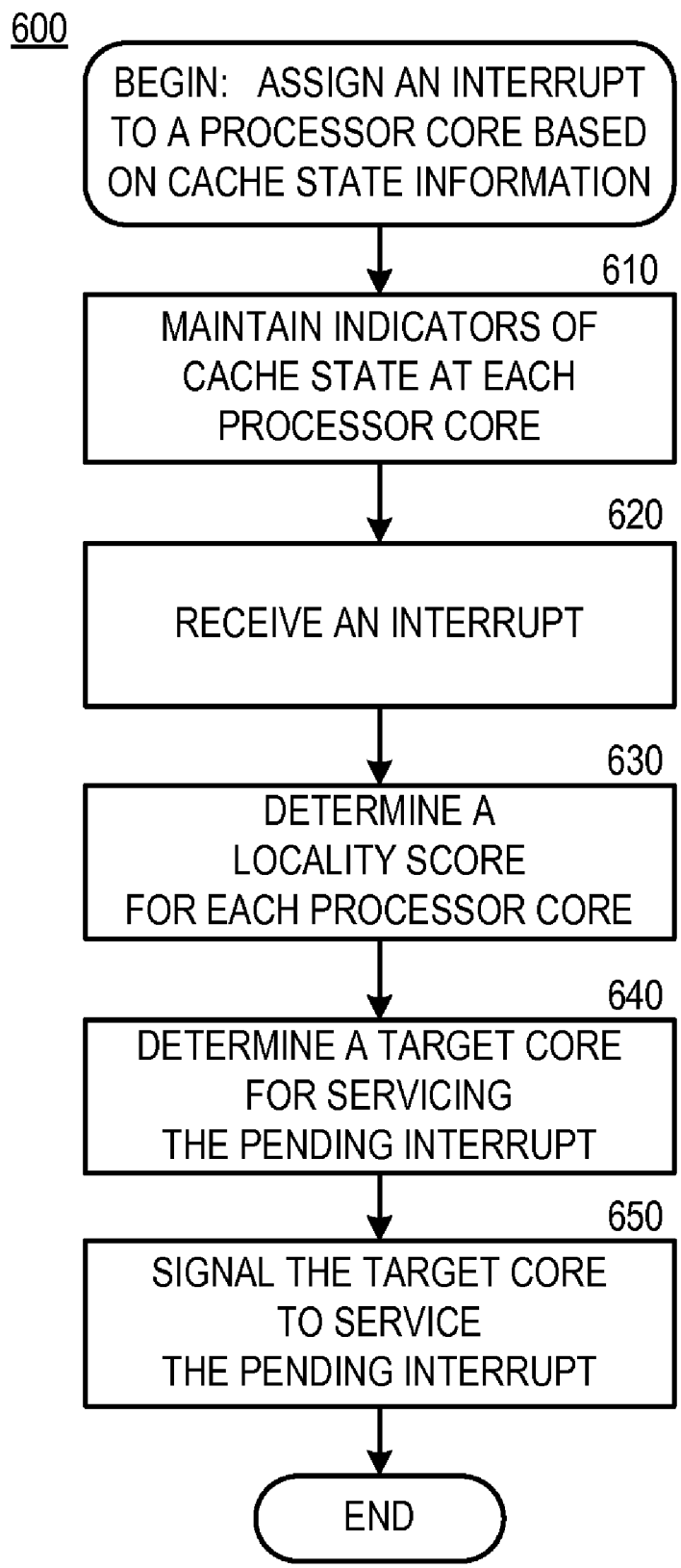
FIG. 6 is a flow diagram illustrating a process for assigning an interrupt to a processor core based on cache state information.

Referring now to FIG. 6, additional details will be provided regarding the embodiments presented herein for assigning interrupts within multiprocessors. In particular, FIG. 6 is a flow diagram illustrating aspects of a process 600 for assigning an interrupt to a processor core based on cache state information according to aspects of embodiments presented herein.

The process 600 can begin at operation 610, where cache state information for each processor core 210 can be maintained. A cache validity structure 420, or indicators, may be maintained by the interrupt controller 220 to track cache state information at the processor cores 210 as it relates to the interrupt handlers 134. The cache validity structure 420 can be used to track whether any code, data, or related TLB entries that are associated with a specific interrupt handler 134 are currently cached at each processor core 210.

Next at operation 620, an interrupt associated with a specific interrupt handler 134 is received. The received interrupt can arrive on interrupt lines 225 to the interrupt controller

220. At operation 630, the interrupt controller 220 can determine values associated with a cache locality score structure 420. The locality scores may be based on the flags set in various instances of the cache validity structure 420 maintained by the interrupt controller 220. A locality score for each processor core 210 can indicate how much of the code and data associated with an interrupt handler 134 is cached by each core.

At operation 640, the interrupt controller 220 can determine a processor core 210, a target core, for executing the interrupt service handler 134 to service the pending interrupt. This determination can be made based on cache validity or cache locality. For example, the cache validity structures 420 or the cache locality score structure 420 may be examined to determine which processor core 210 has the most resources associated with the interrupt handler 134 already within its cache. The resources associated with the interrupt handler 134 may include code, data, and related TLB entries. Servicing the interrupt at a processor core 210 having an increased amount of cached resources may have a reduced negative impact on system performance instead of using another processor core 210 where memory fetches on uncached code or data are performed.

At operation 650, the selected processor core 210, or target core, as determined at operation 640 can be signaled to execute the interrupt handler 134 to service the pending interrupt. The signaling may occur over bus lines, using dedicated signal lines, as a message on an interrupt bus 215, or by any other signaling mechanism as would be appreciated by one of ordinary skill in the art. The selected processor core 210 can resume execution of its current task 305 once execution of the interrupt handler 134 is complete. The process 600 can terminate after operation 650.

Figure 7:
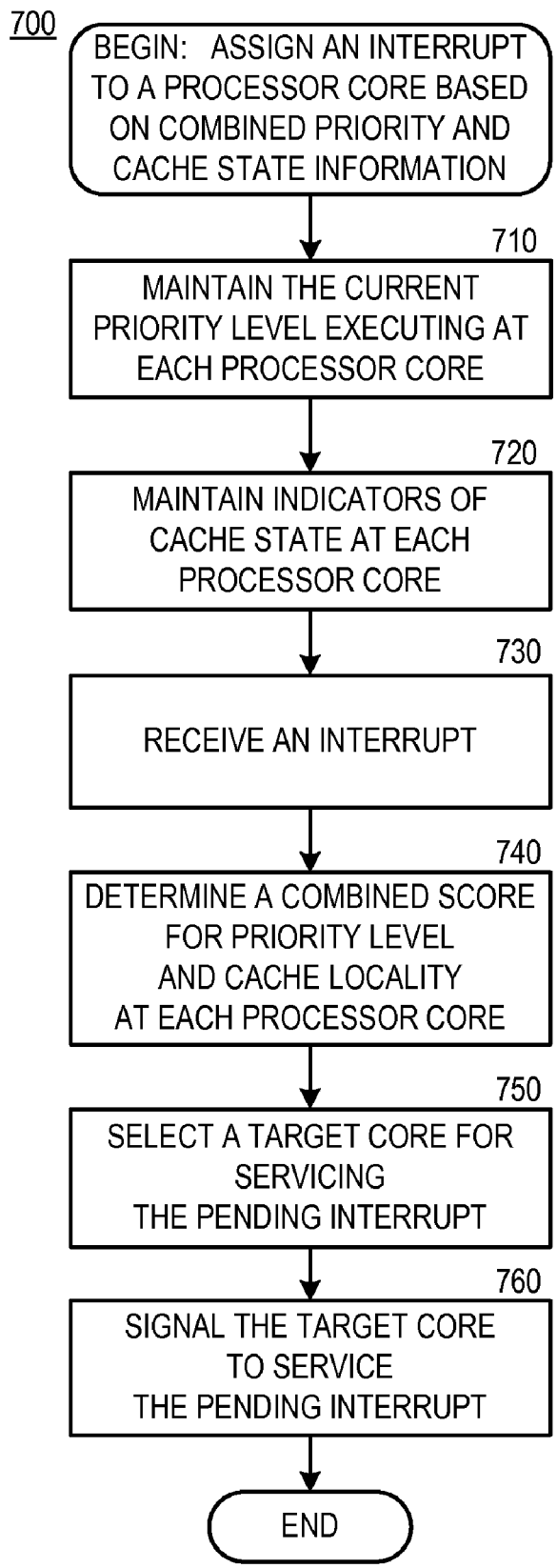
FIG. 7 is a flow diagram illustrating a process for assigning an interrupt to a processor core based on combined priority and cache state information.

Referring now to FIG. 7, additional details will be provided regarding the embodiments presented herein for the allocation of interrupts within multiprocessors. In particular, FIG. 7 is a flow diagram illustrating aspects of a process 700 for assigning an interrupt to a processor core based on combined priority and cache state information according to aspects of embodiments presented herein. The process 700 begins at operation 710, where a priority level for each processor core 210 can be maintained based upon the priority level of the current task 305 executing at each processor core 210. Such priority level information may be maintained at the interrupt controller 220 within a current task priority level structure 410. A default priority level value indicating a lowest possible priority may be used to indicate that a processor core 210 is currently idle.

At operation 720, indicators for cache state information for each processor core 210 can be maintained. A cache validity structure 420 may be maintained by the interrupt controller 220 to track cache state information at the processor cores 210 as it relates to the interrupt handlers 134. The cache validity structure 420 can be used to track whether any code, data, or related TLB entries that are associated with a specific interrupt handler 134 are currently cached at each processor core 210.

At operation 730, an interrupt associated with a specific interrupt handler 134 is received. The received interrupt can arrive on interrupt lines 225 to the interrupt controller 220.

At operation 740, the interrupt controller 220 can determine a combined score based on the priority level and cache locality for each processor core 210. The priority level information may be maintained at the interrupt controller 220 within a current task priority level structure 410. Cache locality may be obtained from a cache locality score structure 420. The locality scores may be based on the flags set in various instances of the cache validity structure 420 maintained by the interrupt controller 220. A mathematical function may be used to combine the lowest priority with the highest locality score. For example, the locality score for each processor core can be normalized to a range equal to the range of possible priority levels and then the current task priority level can be subtracted from that score. Other relationships for combining the two factors would be clear to one of ordinary skill in the art.

At operation 750, the interrupt controller 220 can select a processor core 210, or target core for executing the interrupt service handler 134 to service the pending interrupt. This determination can be made based on the combined score determined in operation 740. The combined score can strike a balance between assigning an interrupt to a processor core 210 executing a low priority task and assigning the interrupt to a processor core 210 having more of the resources for the interrupt handler 134 already within its local cache. Servicing the interrupt at a processor core 210 that balances these criteria may have a reduced negative impact on system performance. Other criteria for determining an interrupt servicing processor core 210 may be used or combined with these criteria without departing from the spirit or scope disclosed herein. These criteria may be selected to reduce the effective cost to the multiprocessor system for servicing interrupts.

At operation 760, the selected processor core 210, or target core, as determined at operation 750 can be signaled to execute the interrupt handler 134 to service the pending interrupt. The signaling may occur over bus lines, using dedicated signal lines, as a message on an interrupt bus 215, or by any other signaling mechanism as would be appreciated by one of ordinary skill in the art. The selected processor core 210 can resume execution of its current task 305 once execution of the interrupt handler 134 is complete. The process 700 can terminate after operation 760.

Figure 8:
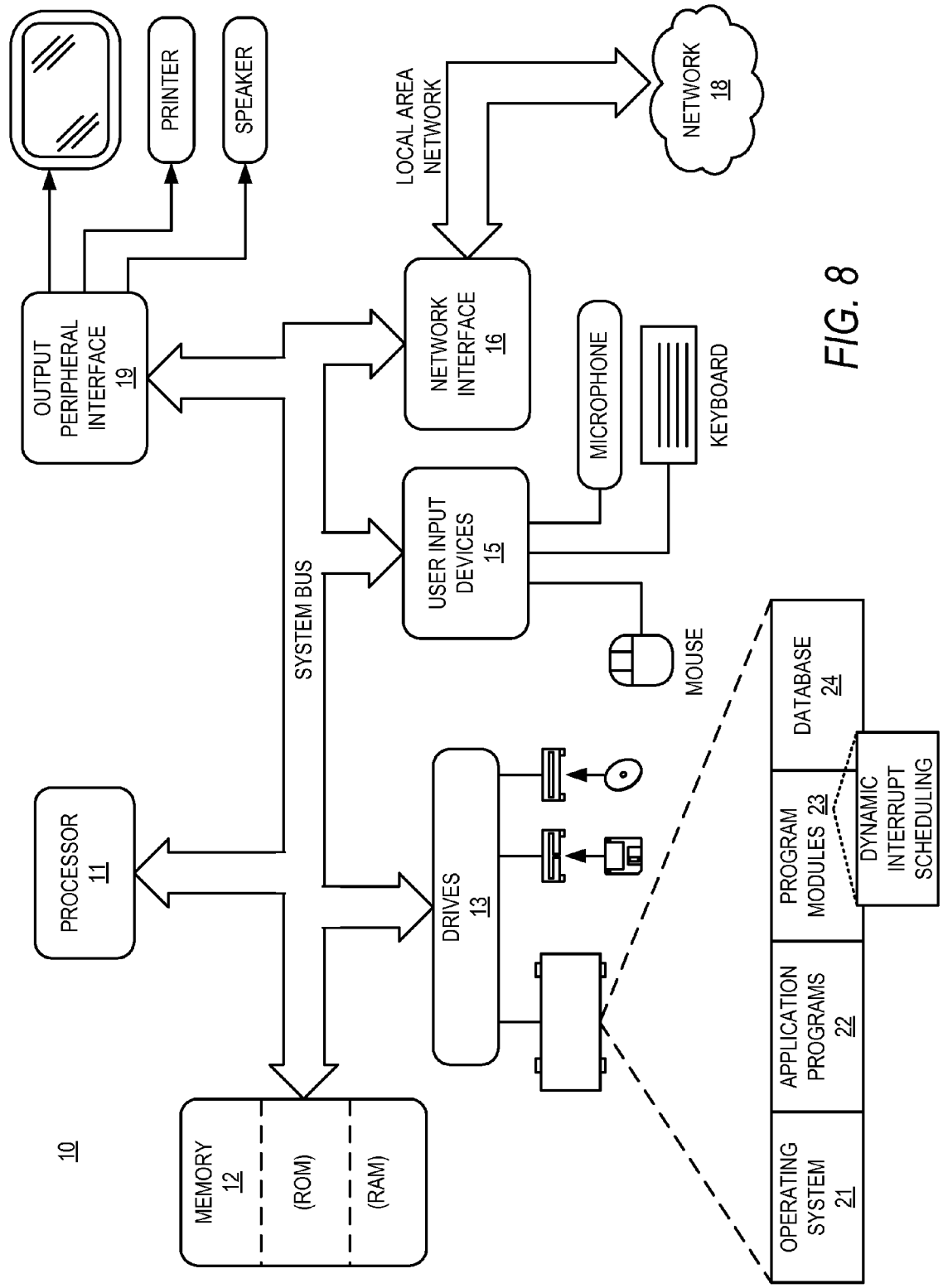
FIG. 8 is a block diagram illustrating an example computing system, all arranged according to at least some of the embodiments presented herein.

With reference to FIG. 8, an example computing system is illustrated for implementing various embodiments. The computing system includes a computer 10. The computer 10 can include a processor 11, a memory 12 and one or more drives 13. The drives 13 and their associated computer storage media can provide storage of computer readable instructions, data structures, program modules 23 and other data for the computer 10. The computer 10 may be implemented as a conventional computer system, an embedded control computer, a laptop, or a server computer, a mobile device, a set-top box, a kiosk, a vehicular information system, a mobile telephone, a customized machine, or other hardware platform. The processor 11 may be a general purpose processor, a processor core, a multiprocessor, a multi-core processor, a graphics processor, a digital signal processing (DSP) processor, a customized computing device implemented within an application specific integrated circuit (ASIC), a customized computing device implemented within a field programmable gate array (FPGA), a customized computing device implemented within any type of programmable logic, a state machine, a reconfigurable processor, any other processing unit, or any combination or multiplicity thereof.

The drives 13, other storage devices, or their associated computer-readable storage media can store an operating system 21, application programs 22, program modules 23, and a database 24. The computer 10 can include user input devices 15 through which a user may enter commands and data. Input devices can include an electronic digitizer, a microphone, a keyboard, a pointing device, or any combination thereof. Examples of pointing devices may include a mouse, trackball, light pen, touch screen, or touch pad. Other input devices to the computer 10 may include a joystick, game pad, satellite dish, scanner, or the like. Input devices can be connected to processor 11 through a user input interface that is coupled to a system bus. The input devices may also be connected by other interface and bus structures, such as a parallel port, game port or a universal serial bus (USB). Computers such as computer 10 may also include other peripheral output devices such as speakers, which may be connected through an output peripheral interface 19 or similar interface.

The computer 10 may operate in a networked environment using logical connections to one or more computers, such as a remote computer connected to network interface 16. The remote computer may be a personal computer, a server, a router, a network PC, a peer device, or other common network node. The remote computer can include many or all of the elements described herein relative to the computer 10. Networking environments may include networks (WAN), local area networks (LAN), intranets, the Internet, or combinations thereof.

When used in a LAN or wireless LAN (WLAN) networking environment, the computer 10 may be connected to the LAN through a network interface 16 or a network adapter. When used in a WAN networking environment, the computer 10 can include a modem or other mechanism for establishing communications over the WAN. The WAN may include the Internet, the illustrated network 18, various other networks, or any combination thereof. It should be appreciated that other mechanisms of establishing a communications link, ring, mesh, bus, cloud, or network between computers may be used.

According to one or more embodiments, computer 10 may be configured such that the processor 11 and/or program modules 23 can perform with or as a computer based upon a multiprocessor 110 or also as a computer executing a virtualization of multiprocessor 110 in accordance with embodiments presented herein. The multiprocessor 110 or the virtual representation of the multiprocessor 110 may support dynamic interrupt scheduling. The computer 10 may include one or more instances of a physical computer-readable storage medium or media associated with drives 13 or other storage devices. The system bus may enable the processor 11 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 12, whether characterized as RAM, ROM, flash, or other types of volatile or nonvolatile memory technology. The media may also represent secondary storage, whether implemented as the storage drives 13 or otherwise. Hard drive implementations may be characterized as solid state, or may include rotating media storing magnetically-encoded information.

The storage media may include one or more program modules 23. The program modules 23 may include software instructions that, when loaded into the processor 11 and executed, transform a general-purpose computing system into a special-purpose computing system customized in accordance with the present disclosure. As detailed throughout this description, the program modules 23 may provide various tools or techniques by which the computer 10 may participate within the overall systems or operating environments using the components, logic flows, and/or data structures discussed herein.

The processor 11 may be constructed from any number of transistors or other circuit elements, which may individually or collectively assume any number of states. More specifically, the processor 11 may operate as a state machine or finite-state machine. Such a machine may be transformed to a second machine, or specific machine by loading executable instructions contained within the program modules 23. These computer-executable instructions may transform the processor 11 by specifying how the processor 12 transitions between states, thereby transforming the transistors or other circuit elements constituting the processor 11 from a first machine to a second machine, wherein the second machine may be specifically configured to support dynamic interrupt scheduling. The states of either machine may also be transformed by receiving input from one or more user input devices 15, network interfaces 16, other peripherals, other interfaces, or one or more users or other actors. Either machine may also transform states, or various physical characteristics of various output devices such as printers, speakers, video displays, or otherwise.

Encoding the program modules 23 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 23 may transform the physical state of the semiconductor memory 12 when the software is encoded therein. For example, the software may transform the state of transistors, capacitors, or other discrete circuit elements constituting the semiconductor memory 12.

As another example, the storage media may be implemented using magnetic or optical technology such as drives 13. In such implementations, the program modules 23 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application.

The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

What is claimed is:

1. A method for handling interrupts within a multiprocessor computing system, the method comprising:
   maintaining state information associated with each processor within the multiprocessor computing system, wherein the state information comprises a cache locality score associated with each processor and a priority level associated with a current task, wherein the cache locality score indicates a quantity of resources to service an interrupt that is cached in a corresponding cache;
   receiving the interrupt to the multiprocessor computing system;
   combining, for each processor, the priority level associated with the current task and the cache locality score for resources associated with servicing the interrupt to form a combined score;
   selecting a processor to service the interrupt based on the combined score; and
   signaling the selected processor to service the interrupt.

2. The method of claim 1, wherein maintaining state information comprises maintaining a priority level associated with a current task for each processor and selecting the processor comprises selecting a processor executing the current task with a low priority level.

3. The method of claim 2, wherein maintaining a priority level comprises receiving the priority level from an operating system associated with the multiprocessor computing system.

4. The method of claim 2, wherein maintaining a priority level comprises receiving the priority level from a module for task switching associated with the multiprocessor computing system.

5. The method of claim 1, wherein maintaining cache state information comprises maintaining a cache validity structure, wherein the cache validity structure comprises a plurality of flags, each of the plurality of flags indicating whether a corresponding cache line or cache page is cached in a cache corresponding to each processor in the multiprocessor computing system.

6. The method of claim 1, wherein maintaining cache state information comprises maintaining a cache locality score structure, wherein the cache locality score structure comprises a plurality of cache locality scores, each of the plurality of cache locality scores indicating a quantity of a corresponding cache line or cache page that is cached in a cache corresponding to each processor.

7. The method of claim 1, wherein selecting a processor to service the interrupt based on the state information comprises selecting the processor having a highest combined score, wherein the processor having the highest combined score is associated with a priority level that is higher than a lowest priority level or with a cache locality score that is lower than a highest cache locality score.

8. The method of claim 1, wherein the cache locality score is weighted depending on a level of the corresponding cache that caches the resources.

9. A system for handling interrupts within a multiprocessor computing system, the system comprising:
   a plurality of processor cores;
   an interrupt line for requesting interrupt service from the multiprocessor; and
   an interrupt controller module operable to
      maintain state information associated with each of the plurality of processor cores, wherein the state information comprises a cache locality score associated with each processor core and a priority level associated with a current task, wherein the cache locality score indicates a quantity of resources to service an interrupt that is cached in a corresponding cache;
      combine, for each processor, the priority level associated with the current task and the cache locality score for resources associated with servicing the interrupt to form a combined score;
      receive the interrupt, and
      identify one of the plurality of processor cores to service the interrupt based on the combined score.

10. The system of claim 9, wherein the interrupt controller module operable is further operable to signal the identified processor core to service the interrupt.

11. The system of claim 9, wherein to maintain state information, the interrupt controller module is further operable to maintain a priority level associated with a current task for each processor core and identifying one of the plurality of processor cores comprises selecting a processor core executing the current task with a low priority level.

12. The system of claim 11, wherein to maintain a priority level, the interrupt controller module is further operable to receive the priority level from an operating system associated with the multiprocessor computing system.

13. The system of claim 11, wherein to maintain a priority level, the interrupt controller module is further operable to receive the priority level from a module for task switching associated with the multiprocessor computing system.

14. The system of claim 9, wherein to maintain cache state information, the interrupt controller module is further operable to maintain a cache validity structure, wherein the cache validity structure comprises a plurality of flags, each of the plurality of flags indicating whether a corresponding cache line or cache page is cached in a cache corresponding to each processor.

15. The system of claim 9, wherein to maintain cache state information, the interrupt controller module is further operable to maintain a cache locality score structure, wherein the cache locality score structure comprises a plurality of cache locality scores, each of the plurality of cache locality scores indicating a quantity of a corresponding cache line or cache page that is cached in a cache corresponding to each processor.

16. The system of claim 9, wherein maintaining state information comprises maintaining a priority level associated with a current task for each processor core and maintaining cache state information associated with each processor core.

17. A computer storage medium having computer-executable instructions stored thereon which, when executed by a computer system, cause the computer system to:
   maintain a priority level associated with a current task for each processor of a multiprocessor computing system;
   maintain cache state information associated with each processor;
   receive an interrupt to the multiprocessor computing system;
   determine a cache locality score for each processor based on the cache state information, wherein the cache locality score indicates a quantity of resources to service the interrupt that is cached in a corresponding cache;
   combine, for each processor, the priority level associated with the current task and the cache locality score for resources associated with servicing the interrupt to form a combined score,
   determine a processor to service the interrupt based on the combined score; and
   signal the determined processor to service the interrupt.

18. The computer storage medium of claim 17, wherein maintaining cache state information comprises maintaining a cache validity structure.

* * * * *